United States Patent [19]
Miller

[11] 3,973,738
[45] Aug. 10, 1976

[54] ARMATURE WINDING AND LEADING CONNECTING MACHINE

[75] Inventor: Jerry E. Miller, Dayton, Ohio

[73] Assignee: The Globe Tool and Engineering Company, Dayton, Ohio

[22] Filed: Feb. 10, 1972

[21] Appl. No.: 225,260

Related U.S. Application Data

[60] Continuation of Ser. No. 871,191, Oct. 15, 1969, abandoned, which is a division of Ser. No. 704,342, Feb. 9, 1968, Pat. No. 3,506,864.

[52] U.S. Cl. .................. 242/7.05 B; 29/205 R; 29/596; 29/597
[51] Int. Cl.² ................. H02k 15/09; H02k 15/095
[58] Field of Search .................. 242/7.05 B, 7.05 R; 29/596, 597, 33.91; 310/234, 265

[56]  References Cited
UNITED STATES PATENTS

| | | | |
|---|---|---|---|
| 2,627,379 | 2/1953 | Moore | 242/7.05 B |
| 2,714,174 | 7/1955 | Applegate | 310/265 |
| 2,756,354 | 7/1956 | Baron | 310/234 X |
| 3,142,890 | 8/1964 | Adams et al. | 29/598 |
| 3,212,170 | 10/1965 | Marshall | 29/598 |
| 3,231,206 | 1/1966 | Moore | 242/7.05 B |
| 3,395,448 | 9/1968 | Moore | 29/596 |
| 3,448,311 | 6/1969 | Mommen et al. | 310/234 |
| 3,474,515 | 10/1969 | Dammar | 29/205 |
| 3,636,621 | 1/1972 | Dammar | 242/7.05 B |

FOREIGN PATENTS OR APPLICATIONS

| | | | |
|---|---|---|---|
| 6,406,162 | 3/1969 | Netherlands | 242/7.05 B |
| 942,026 | 10/1963 | United Kingdom | 242/7.05 B |
| 1,045,384 | 10/1966 | United Kingdom | 242/7.05 B |

Primary Examiner—Billy S. Taylor
Attorney, Agent, or Firm—Dybvig & Dybvig

[57]  ABSTRACT

A machine for winding wire coils on an armature core and connecting the coils to commutator tangs including a pair of fliers and an armature rotating mechanism particularly controlled to completely loop the coil lead wires about suitable commutator tangs circumferentially offset from the sides of wound coils and to completely wrap the wires around the armature shaft.

13 Claims, 21 Drawing Figures

INVENTOR.
JERRY E. MILLER

BY
HIS ATTORNEYS

INVENTOR.
JERRY E. MILLER

INVENTOR.
JERRY E. MILLER

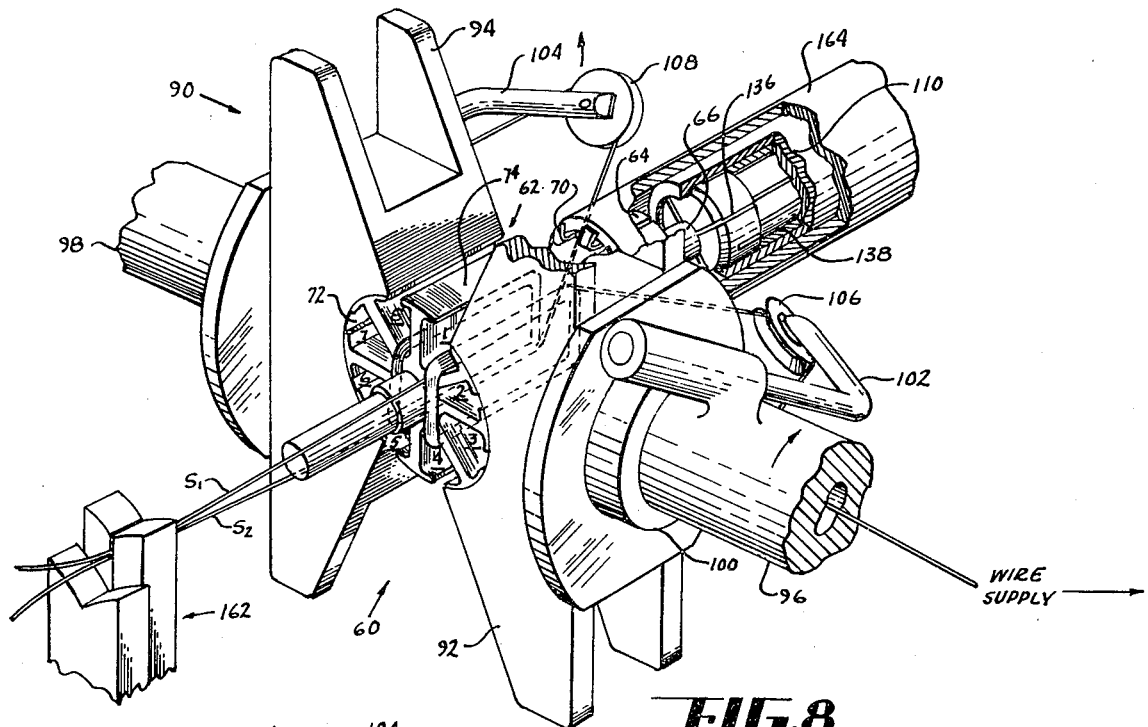
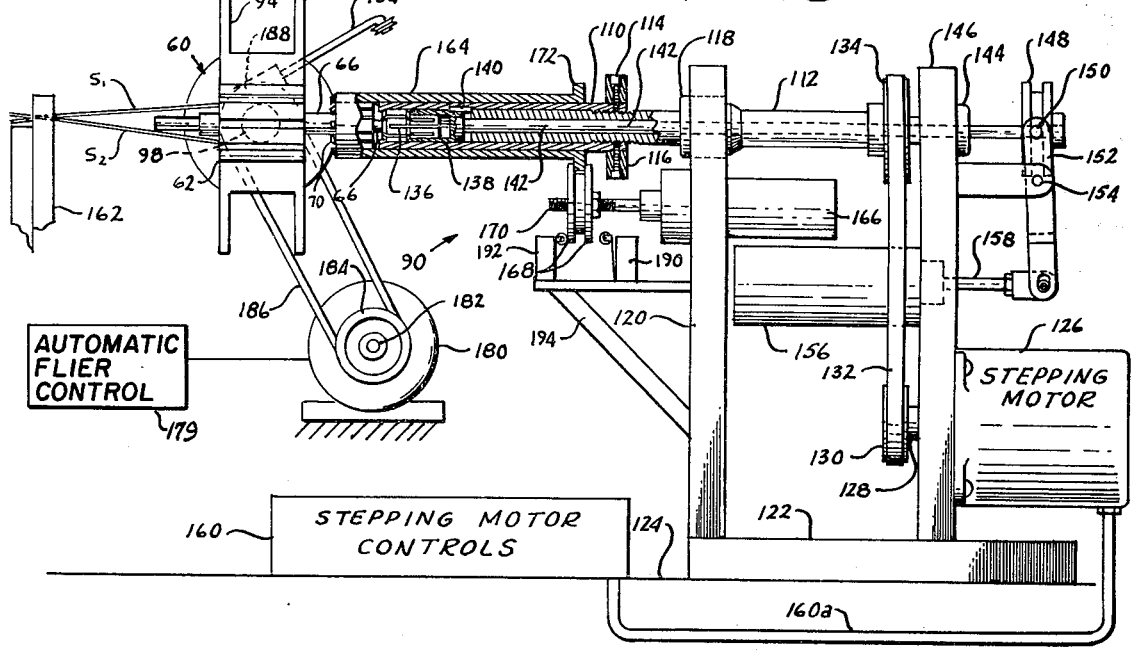

INVENTOR.
JERRY E. MILLER

BY Dybvig and Dybvig

HIS ATTORNEYS

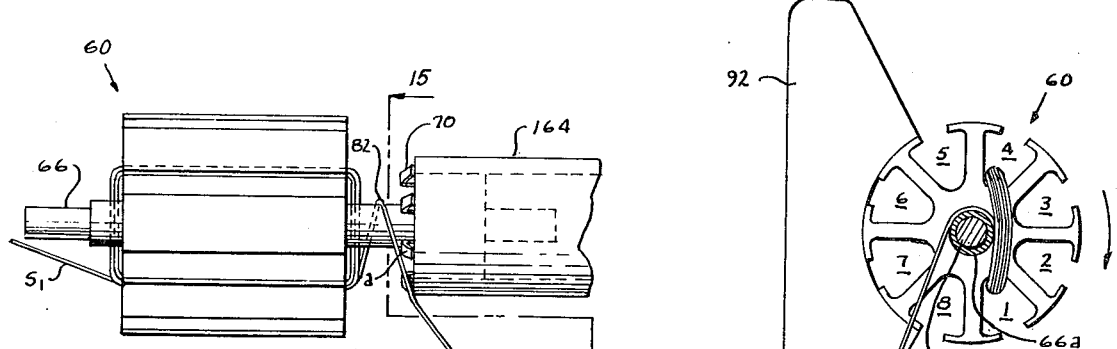
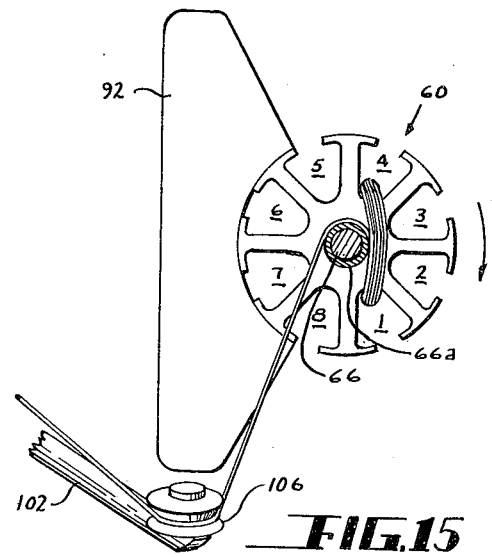
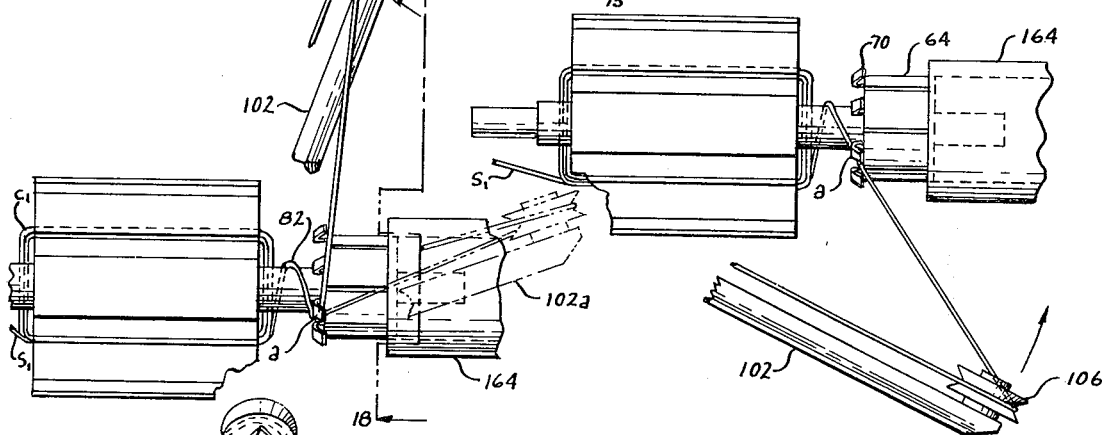
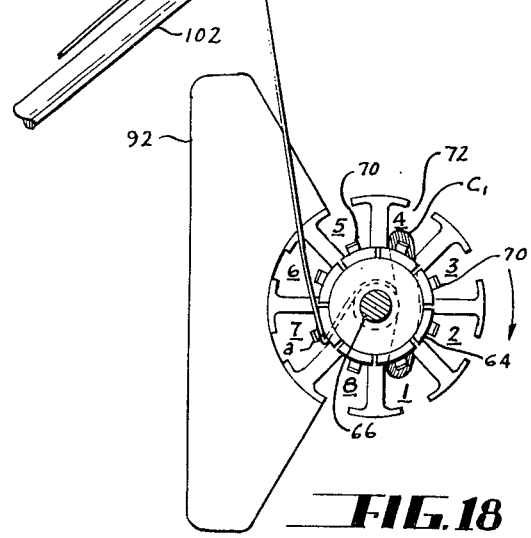

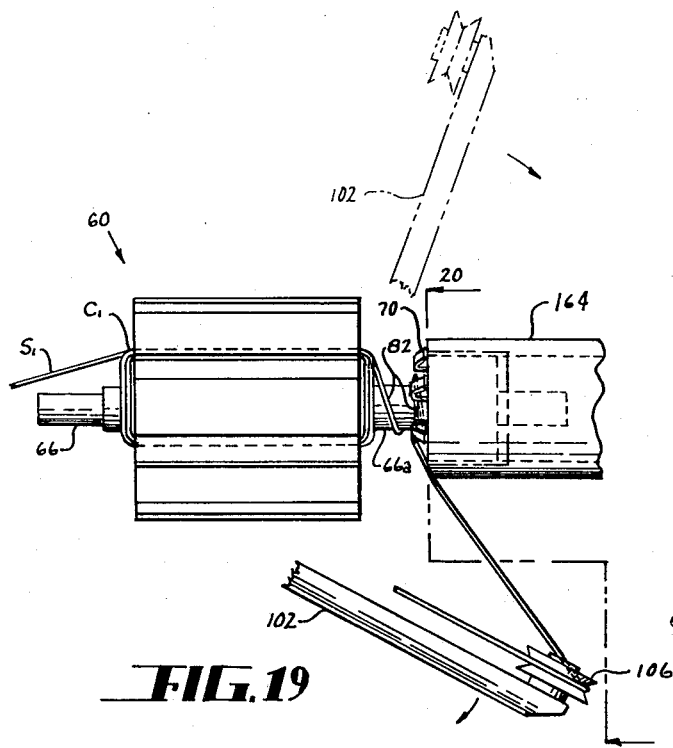
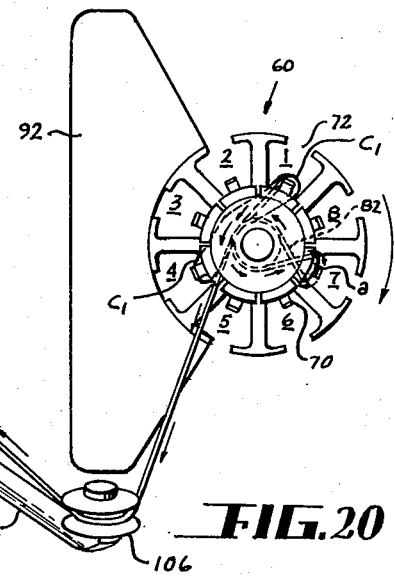
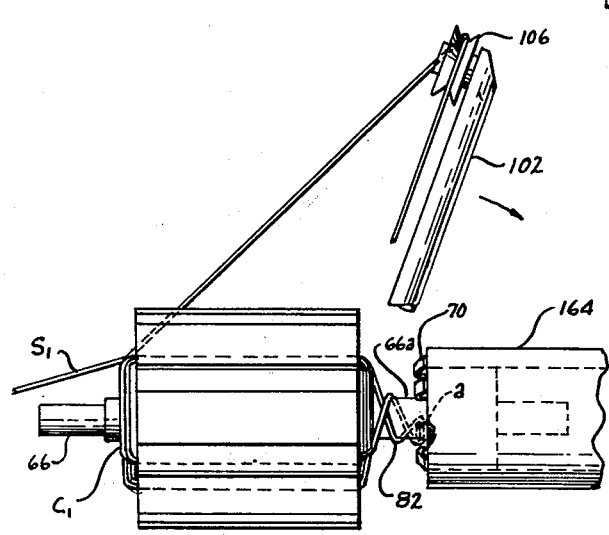

ARMATURE WINDING AND LEADING CONNECTING MACHINE

This is a continuation of application Ser. No. 871,191 filed Oct. 15, 1969, now abandoned which application Ser. No. 871,191 was a division of application ser. No. 704,342 filed Feb. 9, 1968, now U.S. Pat. No. 3,506,864, granted Apr. 14, 1970.

This invention relates to armature winding and more particularly to the winding of armatures with commutators having tangs. It will become apparent, however, that the invention is not necessarily so limited.

Several types of armature winding machines have been developed and are in use in everyday production. The various types of armature winding machines include machines wherein an armature is rapidly rotated with respect to a wire guide in such a fashion that wire is drawn from a wire supply through the wire guide to form wound coils in pairs of slots in the armature. Another type of armature winding machine employs a wire guide which is reciprocated to traverse the length of an armature. At each end of the armature core the wire guide normally hesitates and the armature is oscillated to present a different slot in position to receive wire from the wire guide. Still another type of armature winding machine incorporats a rotating wire guide or flier which cooperates with a wire guide wing against which an armature core is placed such that when the flier is rotated a coil is wound in a pair of slots in the armature core. Several variations of the three types of machines mentioned above have been used. In each type, machines have been developed which wind more than one coil at a time and in some cases all of the coils for an armature may be wound simultaneously.

A popular type of automatic armature winding machine in present use is known as the "double flier" armature winding machine. This type of machine is relatively simple in construction yet quite versatile and fast operating. A conventional double flier type armature winding machine will normally have wire from two supply reels coursed separately through two spindles on which the fliers are mounted. The start ends of the wires are held by a clamp or clamps adjacent the axis of the armature shaft of the armature core to be wound. When both fliers are subsequently rotated, wire will be guided from the fliers by wire guides or wings into two pairs of armature slots. A double flier machine can readily be tooled and controlled to wind either one coil for each slot, or a total of two coil sides in each slot, or else two coils per slot. Also, as disclosed in U.S. Pat. No. 2,670,145 issued to John M. Biddison on Feb. 23, 1954, double flier armature winding machines can be used to wind coils in armatures having an odd number of slots by temporarily disabling one flier as the first coil (or coils) is wound in a first pair of slots. The coils wound in subsequent pairs of slots are than wound by both fliers.

Various types of patterns of wind for armature coils have been developed taking into consideration the special requirements of a double flier armature winding machine. Between each coil wound by a flier, a commutator lead connection must be formed by the wire. This commutator wire lead connection may be in the form of a lead loop such as described for example in the Harry W. Moor U.S. Pat. No. 2,627,379, issued Feb. 3, 1953. After the armature is completely wound the lead loops are connected to the commutator segments. In some cases the wires leads are temporarily connected to the commutator segments during the automatic winding cycle of the winding machines. One of the difficulties encountered in armature winding machines is the need to provide for the winding of a coil and the subsequent formation of a lead, whether in the form of a lead loop or a connection to a commutator segment, and then the winding of a second coil by the same flier without uncoiling or unraveling the wire already wound.

To form wire leads yet not unwind previously wound coils during the automatic operation of an armature winding machine, it is now conventional to form what is known as an "anchored lead" between each coil. The anchored lead includes a length of wire through a slot adjacent one of the pairs of slots in which a coil is wound either just before or just after the lead loop or the commutator connection is made. As a result, the lead wire is "anchored" to one of the teeth which separates the armature slots. U.S. Pat. No. 3,191,269 granted to Harry W. Moore on June 29, 1965, illustrates various winding patterns having anchored leads.

There are several drawbacks to the use of anchored leads. The lengths of wire passing through the adjacent slots extend in the opposite electrical direction to the wires forming the coil sides therein and, electrically, these lengths of wire perform no useful function. Some armatures are so small in relation to the wire size used therein that they cannot accept the electrically useless wire or wires in each slot. The electrically useless wire or wires in each slot invariably add to the total length of wire used in winding an armature. Further, the movements of the fliers and of armatures being wound when the leads are being formed have been quite complex and time consuming partly because of the necessity of placing the useless wire in the slots. In fact, because the fliers can be rotated at extremely fast speeds when winding coils, a quite significant portion of the automatic cycle for winding a typical armature is consumed during the intervals in which the leads are formed.

A preferred type of connection of a wire lead to a commutator segment is the tang type. Risers or slots in commutator segments are typically difficult to produce and the final connection may not have the strength of the tang type connection. Temporary tang type connections can conveniently be made during the automatic cycle of a winding machine by appropriate movement of the armature being wound, the flier or fliers, and a tang shield which is used to prevent accidental hooking of the wire to the tang during the winding of the coils. The final permanent connection is readily and easily made by applying a hot stake to the upturned end of the tang which fuses the lead to the tang and at the same time burns off or evaporates the insulating coating from the wire lead.

As discussed in the aforementioned Moore U.S. Pat. No. 3,191,269, the problem arises that wire leads connected to the commutator tangs during the early part of the automatic winding cycle may be wound under coils subsequently formed and the first formed leads are placed under considerable tension by coils wound thereover. In the extreme, this could result in breakage of the leads and in every case the danger exists that the insulating coating on some of the leads may be destroyed during the winding cycle, or when additional strain, due to the centrifugal forces acting thereon, is exerted on the leads when the armature is in operation. For these reasons, the Moore U.S. Pat. No. 3,191,269 discloses leads extended partially around an armature shaft to commutator segments remote from the slots from which the leads extend. The leads thus formed are less likely to be placed under tension by coils subsequently wound and will be at least partially supported by the armature shaft.

Some armatures, and especially armatures having two coils per slot, have not had tang type connections because space limitations between adjacent tangs would result in mutual engagement of lead wires quite close to the tangs. During the hot staking of the leads, the insulating coating of the touching lead wires would often be destroyed. Even if not destroyed during the hot staking operation, the lead wires may constantly abrasively rub against one another because of the centrifugal forces acting thereon when the armature is in use, and the insulation may ultimately be weakened or destroyed.

An object of this invention is to provide an improved winding pattern for armatures. The winding pattern of this invention requires less wire and has a lead which is more fully supported by the armature shaft than conventional prior art commutator leads. It does not have the electrically useless wires extending through any of the slots. As a result, the armature is both mechanically and electrically superior to prior art armatures automatically wound. This object is accomplished by wrapping the wire leads completely around the armature shaft whereupon the armature shaft rather than the teeth between armature slots serves to anchor the leads. This winding pattern is well suited for use with commutators having tangs. However, the winding pattern may also be useful with commutators having slots or risers for lead connections. Furthermore, the winding pattern is adaptable for use in winding armatures having either an odd or an even number of slots whether or not one or two coils per slot are formed.

Another object of this invention resides in the provision of an improved commutator lead connection for tang type commutators. This is accomplished by looping a lead wire under and then over and back under its associated tang. The lead wire thus crosses over itself immediately beneath the tang. Destruction of the insulation at this point, either from the hot staking process or from mutual abrasion of the crossed wires, is harmless because the crossed wires are electrically identical. The points of crossover of lead wires adjacent commutator segments are spaced relatively far from the commutator and thus are unaffected by the heat generated during the hot staking operations.

Further, it is an object of this invention to advantageously utilize the aforementioned improved lead connections in the aforementioned improved winding pattern. As a result the support of lead wires by the armature shaft is maximized and, accordingly, the adverse effects of the centrifugal forces acting thereon minimized.

Other objects of this invention are to provide improved apparatus for winding armatures. The improved apparatus are embodied in a flier type armature winding machine and involve a considerable simplification over prior methods and apparatus for automatically winding armatures. The armature need be rotated or indexed in one direction only throughout the entire automatic winding cycle. The flier throughout is rotated primarily in one direction, it only being necessary to reverse rotate the flier at the end of each coil wound in the event the lead wire is to be connected to a commutator segment during the ordinary winding cycle. As will become apparent the flier type armature winding machines could either be of the single flier type or the double flier type.

Other objects and advantages will become apparent from the following description. For example, as will be described below, the winding pattern and the methods and apparatus in accordance with this invention are advantageously adapted to wind armatures having opposite polarities with very little change in the winding pattern or the machine embodying the method and apparatus of this invention.

Referring to the drawings:

In FIG. 6, one strand of wire forms the entire winding.

FIG. 8 is a perspective view, with parts broken away and shown in cross section, of a portion of an armature winding machine in accordance with this invention and illustrating a partially wound armature.

FIG. 9 is a side elevational view of the machine of FIG. 8 with parts omitted, broken away and in cross section and illustrating additional parts of the machine.

FIGS. 14 through 20 illustrate the sequence of steps for forming a wire commutator lead connection in accordance with this invention. FIGS. 14, 16, 17 and 19 are side views similar to FIGS. 10 and 12. FIGS. 15, 18 and 20 are views similar to FIGS. 11 and 13, taken along section lines 15—15, 18—18 and 20—20 of FIGS. 14, 17 and 19, respectively. In FIGS. 18 and 20 the commutator is shown in end view with a tang shield removed.

Figure 10:
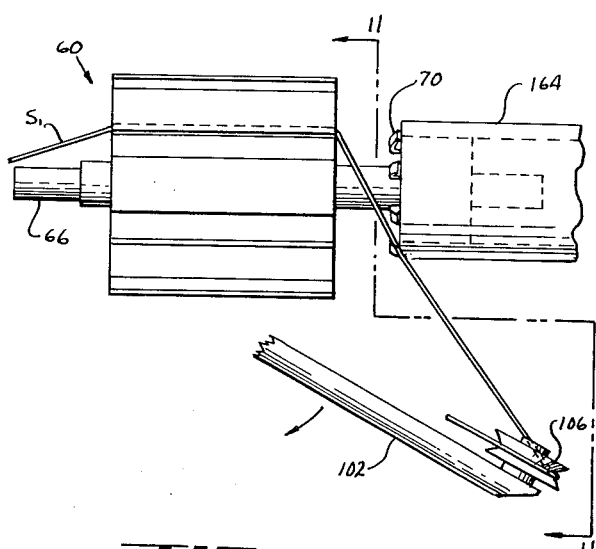
FIG. 10 is a side elevational view of an armature and a portion of the winding machine of FIG. 8 and the wire used in forming the armature windings, as these parts appear near the beginning of a winding operation.

FIG. 21 is a side elevational view similar to FIG. 10 illustrating the position of parts at the beginning of the winding of a second coil.

Figures 1, 2, 3:
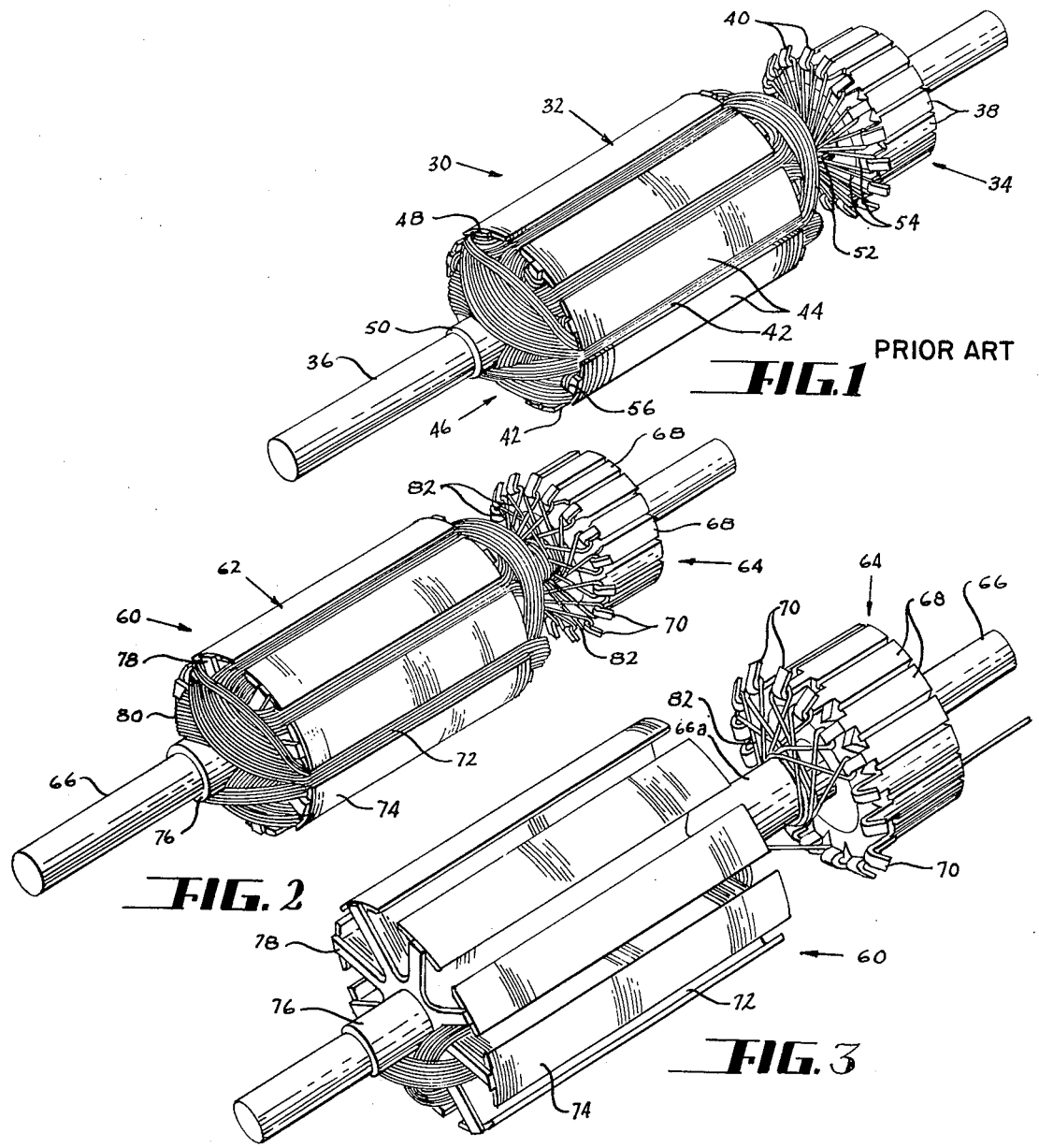
FIG. 1 is a perspective view of an armature having a prior art winding.
FIG. 2 is a perspective view of an armature wound in accordance with the present invention.
FIG. 3 is an enlarged perspective view of the armature of FIG. 2 when partially wound.

Referring to the drawings in greater detail, FIG. 1 illustrates an armature 30 of the type having a laminated core 32 and a commutator 34 mounted on an armature shaft 36. The commutator 34 has a plurality of circumferentially spaced commutator segments 38 terminating in hook-shaped tangs 40 adjacent one end of the laminated core 32. The core 32 has a plurality of radially extending slots 42 separated by T-shaped teeth 44 which receive coil windings 46. As well known, the coil windings 46 are wound from insulated wire. To prevent electrical contact between the windings 46 and the other parts of the armature 30 which might be caused by rubbing of the insulated wire on the metal parts of the armature during the winding process or during subsequent use of the armature, the windings 46 are completely isolated from the armature core 32 and the shaft 36. Thus, there will be a U-shaped slot insulator (not shown) in each of the slots 42. Both ends of the commutator 34 are covered by insulating end pieces 48. An insulating sleeve 50 surrounding the shaft 36 abuts the end 48 farthest from the commutator end of the armature 30 and a similar insulating sleeve 52 extends between the commutator 34 and the adjacent end of the armature core 32.

The armature 30 is of the type having two coils per slot. Since each coil has two coil sides, one in each of two slots, a total of four coil sides are located in overlapping relation in each slot 42. Between each coil of the coil windings 46 there is a wire lead 54 formed from the same wire as the coil windings 46. The wire leads 54 in FIG. 1 are of the type illustrated in the aforementioned Moore U.S. Pat. No. 3,191,269. Accordingly, each wire lead 54 projects out of one of the slots 42 and partially around the armature shaft 36 to a selected commutator tang 40, over the selected tang 40, and then back along a generally parallel path to either the same or an adjacent slot 42. Each wire lead 54 is partially supported by the armature shaft 36 by engaging the sleeve 52. In addition, each wire lead 54 includes or is accompanied by a length of wire extending through a slot adjacent to one of the slots in which either the previous coil or the subsequent coil is wound, whereupon the strand of wire is hooked about one of the teeth 44 to anchor the leads 54 in position and thereby prevent unraveling of the wire during subsequent winding operations. The portions of the wires between coils hooked about the teeth 44 are indicated by the reference charactered 56 in FIG. 1. Because there are two coils per slot in the armature of FIG. 1, there are also two hooked portions 56 wrapped about each tooth 44. There are eight slots in the armature of FIG. 1. Accordingly, sixteen commutator segments 38 with tangs 40 are required for the sixteen wire leads 54. As already mentioned, the basic winding pattern of FIG. 1 as well as the basic winding pattern to be described below can be used in winding armatures having a different number of slots as well as in armatures wherein there is to be only one coil in each pair of slots.

Those skilled in the art will recognize that the armature 30 of FIG. 1 is not completely finished. Further finishing operations would include the insertion of insulating wedges or ropes at the top of the slots 42 and, frequently, the impregnation of the windings 46 with a varnish or like material. Also, the commutator tangs 40 would be subjected to heat and pressure as by a hot staking operation to fuse the wire leads 54 thereto and at the same time to burn insulation off from the wire forming the leads 54.

The commutator lead arrangement of FIG. 1 is satisfactory for many purposes. It is apparent, however, that a considerable portion of each of the wire leads 54 is unsupported. Also, in cases where the commutator tangs are closer together than shown in FIG. 1, or the wire diameter is greater than that shown in FIG. 1, adjacent leads 54 would be quite close together and may even be in mutual engagement close to the tangs 40. In such cases, the hot staking operation may cause the wire insulation to be burned off to the point of mutual engagement whereupon wire leads to adjacent tangs 40 would be shorted. Also, the armature of FIG. 1 suffers from the drawbacks resulting from the lengths of wire between coils hooked around the armature teeth 44. Since these lengths of wire are electrically useless, it is apparent that electrically equivalent armatures could be made if these were omitted. Omission of the electrically useless lengths of wire would obviously result in a lesser amount of wire required to wind an armature and, therefore, could result in a considerable cost savings in the mass production of armatures. Some armatures, especially those employing large diameter wires, cannot be wound as illustrated in FIG. 1 because the slots 42 are completely filled by the coil turns to meet power requirements and there is insufficient space in the slots 42 for the electrically useless lengths of wire.

An armature of the type made in accordance with this invention is illustrated in FIG. 2. In FIG. 2, the armature, generally designated 60, has a laminated core 62 and a commutator 64 mounted on an armature shaft 66. The commutator 64 has sixteen commutator segments 68 with tangs 70 adjacent one end of the laminated core 62. The eight radial armature slots 72 of the armature 60 are separated by armature teeth 74. As before, a completed armature 60 would have insulators such as the insulating sleeve 76 and end-piece 78. Thus, except for the coil windings, designated 80, and the wire leads, designated 82, the armature 60 may be identical to the armature 30.

In FIG. 2 the wire leads 82 are wrapped more than 360 degrees around the shaft 66 and are also looped completely about the commutator tangs 70. For this reason, each wire lead crosses over itself immediately beneath its associated tang 70. The wrapping of the wire leads 82 about the shaft 66 serves to anchor them and, accordingly, there are no dead or electrically useless wires in the armature 60 of FIG. 2 corresponding to the wire portions designated 56 in FIG. 1.

FIG. 3 shows a portion of the armature 60 of FIG. 2 when partially wound. The wrapping of the wire leads 82 about the shaft 66 is clearly illustrated in FIG. 3. It will be observed that each wire lead 82 is projected out of a radial armature slot 72 partially around the shaft 66 and beyond its associated tang 70, then wrapped or looped back over its associated tang 70, and then continued about the shaft 66. The extension of each wire lead 82 first beneath its associated tang 70 and then over the same tang 70 and then on around the shaft 66 results in each wire lead 82 being wrapped about the shaft 66 close to the commutator 64. Accordingly, the leads 82 formed during the early part of the winding operation are not wound under or placed under tension by the subsequently wound coil forming the windings 80. In the final finishing operations, wherein the tangs 70 are hot staked, the likelihood that adjacent leads 82 will be in mutual engagement sufficiently near the hot stake to cause shorting is considerably reduced. It is possible that heat applied to the tangs 70 will remove insulation to the point where each lead 82 crosses itself. Removal of the insulation at this point of each lead 82 is harmless because the two crossing wire portions are electrically identical.

Figure 4:
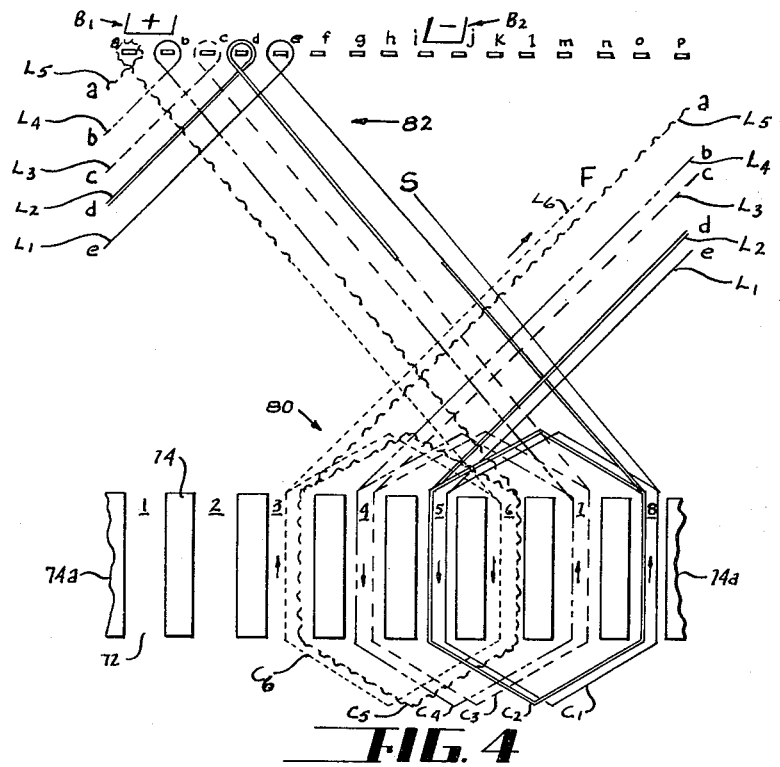
FIG. 4 is a portion of a possible winding diagram for the armature of FIG. 2.
Figure 5:
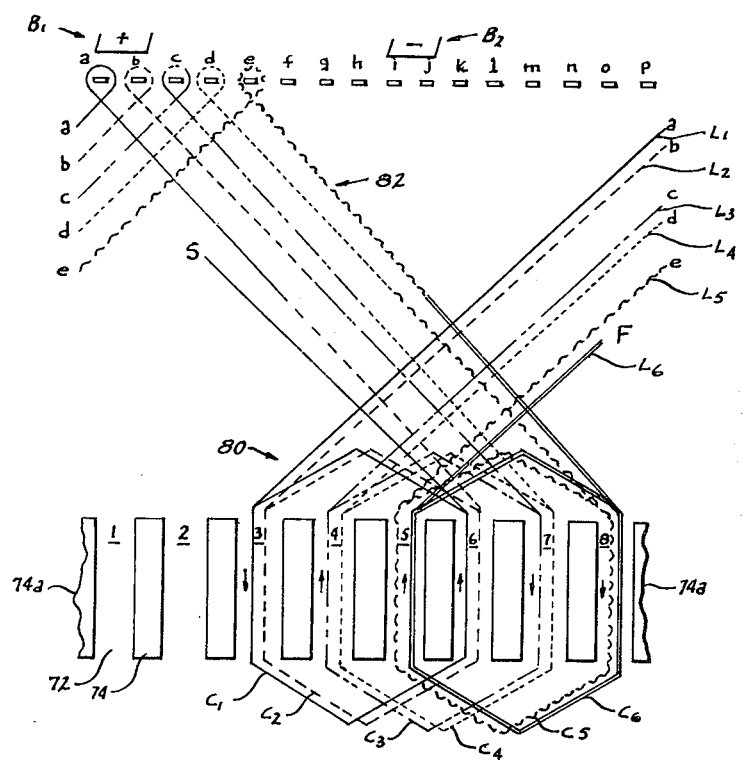
FIG. 5 is a portion of a winding diagram of the same type of armature as FIG. 4 but wound with the opposite polarity.

FIGS. 4 and 5 are winding diagrams, either of which may be used as the winding pattern of the armature of FIGS. 2 and 3. For reasons which will be discussed later, the winding diagram of FIG. 4 may be referred to as "retrogressive" and the winding diagram of FIG. 5 as "progressive." For convenience, six coils, designated $C_1$ through $C_6$, forming part of the windings 80, are shown in FIGS. 4 and 5 as if wound from a single strand of wire beginning with a start end S and ending in a finish end F which forms part of a wire lead $L_6$. If the complete winding pattern were illustrated, there would be sixteen coils shown between the start end S and the finish end F. The individual armature slots 72 are labeled 1 through 8 and the individual tangs 70 are labeled $a$ through $p$. As conventional, the winding diagrams of FIGS. 4 and 5 represent armatures "laid flat" with the sixteen tangs 70 shown side-by-side and the slots 72 separated by eight teeth 74 shown side-by-side. In order to completely show each of the eight slots 72, one tooth, designated 74a, is shown on each side of FIGS. 4 and 5. The wire leads 82, designated $L_1$ through $L_5$, are shown progressing out of the slots 72 and toward the right side of FIGS. 4 and 5 to the positions designated $a$, $b$, $c$, $d$ and $e$ conforming to the particular tangs 70 to which the wire leads 82 are directed. Because the wire leads are wrapped or looped about the armature shaft 66 (not shown in these diagrams), the same positions $a$, $b$, $c$, $d$ and $e$ are duplicated on the left side of FIGS. 4 and 5. It will be understood that the wire leads 82 are continuous and not broken, it being impossible to clearly illustrate the wrapping or the looping of the wire leads about the shaft 66 in a winding diagram of this type.

Referring specifically to FIG. 4, proceeding from the start wire S, wire is wound downwardly through slot 8 and upwardly through slot 5 to form the coil $C_1$. (The arrows in the armature slots 72 refer to the direction of current flow and not to the direction of wind.) By convention, the entire coil $C_1$ is represented by a single line. In practice, the coil $C_1$ would normally be formed from many turns of wire, each turn progressing downwardly through slot 8 and upwardly through slot 5 with its end turns spanning the end of the armature core between slot 8 and slot 5. After the appropriate number of turns have been wound, the wire lead designated $L_1$ projects out of slot 5 and in the same direction as the wire turns forming the coil $C_1$ and, thence, around the armature shaft 66 to the tang 70 designated $e$. After being looped about the tang $e$ in the manner previously described, the wire is continued about the shaft 66 and again downwardly through the slot 8 and upwardly through the slot 5 to form the coil $C_2$. To distinguish between the coils $C_1$ and $C_2$, the coil $C_2$ is shown as a double line. After the appropriate number of turns of wire have been wound in slots 8 and 5 to form the coil $C_2$, the wire lead $L_2$ is extended from slot 5 in a direction generally parallel to the wire lead $L_1$ partially around the shaft and is then looped about the tang $d$ and continued around the shaft. Two coils have now been wound in the pair of slots 8 and 5. From the tang $d$ the wire progresses downwardly through slot 7 and upwardly through slot 4 to form the coil $C_3$ in these slots, the coil $C_3$ being pictorally represented by a dash line. After the appropriate number of turns, the wire lead $L_3$ projects from slot 4 to tang $c$ and subsequently the coil $C_4$, which is designated by a broken line, is formed in the same pair of slots 7 and 4 with the wire lead $L_4$ projecting therefrom and looped about the tang $b$. Following the same winding pattern, the coil $C_5$ is then wound in slots 6 and 3 with the wire lead $L_5$ projecting therefrom looped about the tang $a$ and the coil $C_6$ is formed in the same pair of slots with the wire lead $L_6$ projecting therefrom. As mentioned above, the winding diagram of FIG. 4 is only partially completed. If the winding diagram were complete, the wire lead $L_6$ would be shown looped about the tang $p$ with subsequent wire leads being looped about tangs $o$, $n$, $m$, and so forth.

In FIG. 5 the coils $C_1$ and $C_2$ are shown wound in slots 6 and 3 with the wire lead $L_1$ therebetween looped about the tang $a$. The wire lead $L_2$ extending from the coil $C_2$ is looped about the tang $b$ and enters into slot 7 to the start of coil $C_3$ wound in slots 7 and 4. The location of the coils $C_4$, $C_5$ and $C_6$, follow the same pattern as that of FIG. 4 except that, in FIG. 5, the coils $C_5$ and $C_6$ are wound in a pair of slots 8 and 5 to the right of slots 7 and 4 which receive the coils $C_3$ and $C_4$. The wire leads $L_3$, $L_4$ and $L_5$ are, in the case of FIG. 5, connected or looped about the tangs $c$, $d$ and $e$. Wire lead $L_6$ in FIG. 5, of course, would be connected to tang $f$ and the winding would progress if the completed winding pattern were shown in FIG. 5 with the next coil wound in slots 1 and 6.

It should be noted in connection with both FIGS. 4 and 5 that, after the windings are complete, the start and the finish ends of the wire would lose their identity. Thus, in FIG. 4 the start end and the finish end would ultimately be connected together around the tang $f$ and together would form another wire lead 82. Similarly, in FIG. 5 the start end and finish ends of the wire would be wrapped together around tang $p$ to form a wire lead 82. As will be further described below, the windings may conveniently be formed from two strands of wire with the start end of one strand connected to the finish end of the other strand and vice versa. The winding patterns of FIGS. 4 and 5 are suited to flier type winding machines and especially double flier armature winding machines and the foregoing description has proceeded with the assumption that the winding would commence with the start end illustrated. It will be appreciated by those skilled in the art, however, that the winding pattern need not be accomplished by a flier type winding machine.

Also illustrated in FIGS. 4 and 5 are a pair of commutator brushes $B_1$ and $B_2$ positioned as brushes may be positioned when fully wound armatures of the type illustrated therein are in use in an electric motor. For purposes of discussion it is assumed in both FIGS. 4 and 5 that, at a given instant, the brushes $B_1$ span tangs $a$ and $b$ and are the positive brushes while the brushes $B_2$, spanning tangs $i$ and $j$, are the negative brushes. Conventional current flow, that is from positive to negative, is also assumed. Although there appears to be very little difference between the armatures of FIGS. 4 and 5, it will be obvious that the two armatures illustrated therein are of opposite polarities. With the brush connections illustrated in FIG. 4, the coil $C_5$ in slots 6 and 3 is the commutated or shorted coil because the wire leads at each end of the coil $C_5$, being connected to the tangs $a$ and $b$, are connected to the positive brush $B_1$. Current flow in coil $C_6$ is upwardly through slot 3 and downwardly through slot 6. Current flow through the other coils is as indicated by the arrows in the slots 72 of FIG. 4. In FIG. 5, the shorted or commutated coil is coil $C_2$ which is also in slots 3 and 6. However, current flow is downwardly through coil $C_1$ in slot 3 and upwardly through slot 6 and, as indicated by the arrows appearing in the slots 72 of FIG. 5, the current flow through each of these slots 72 is opposite to that shown in FIG. 4. As will be discussed below, the same flier type armature winder, with only a minor change in a control setting, can be used to wind either the pattern of FIG. 4 or that of FIG. 5.

Figure 6:
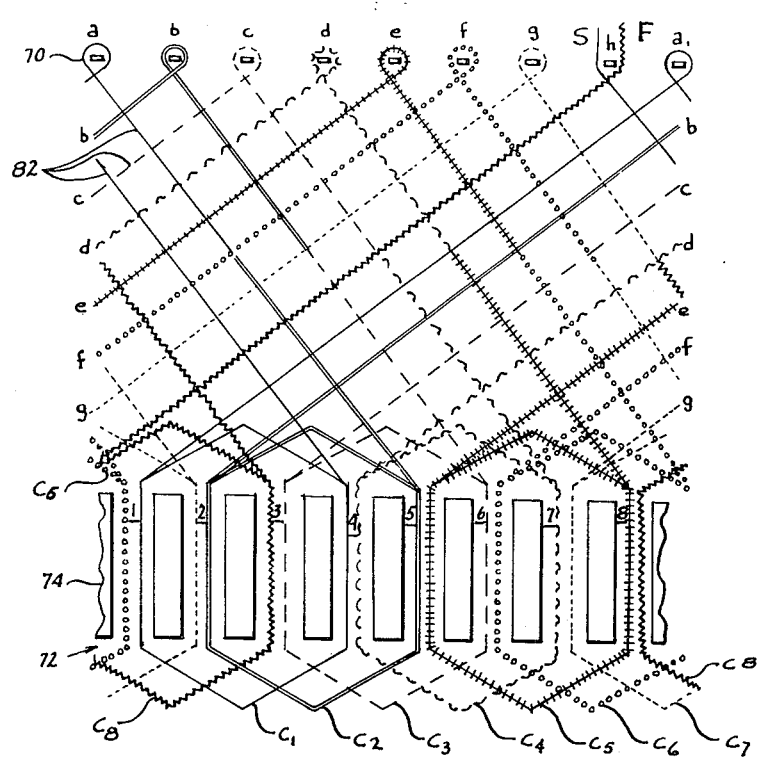
FIG. 6 is a completed winding diagram of another pattern of wind in accordance with this invention.
Figure 7:
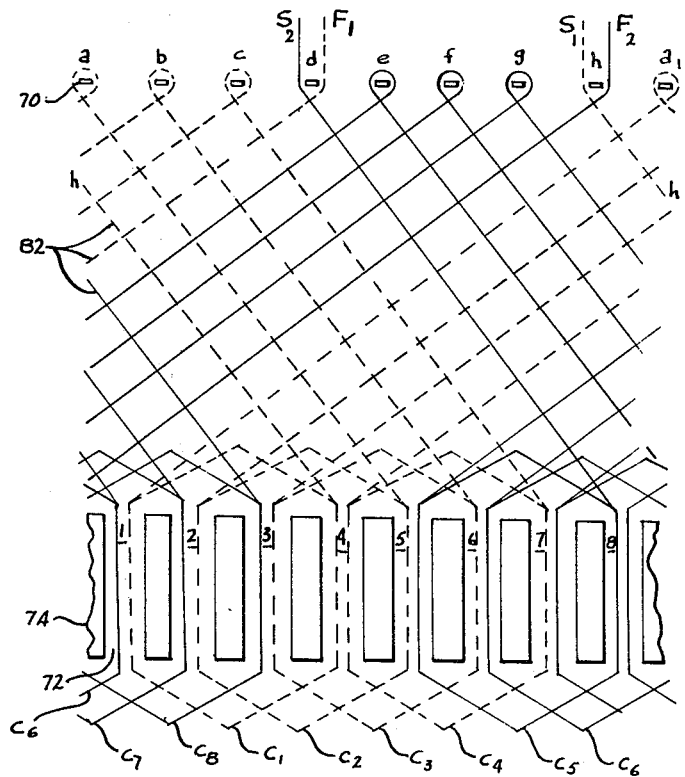
FIG. 7 is a winding diagram of a pattern of wind for an armature electrically identical to the pattern of wind of FIG. 6 but wound from two strands of wire.

FIGS. 6 and 7 are complete winding diagrams of eight slot armatures having one coil per slot and, accordingly, eight tangs, wound with wire leads 82 wrapped around the armature shaft (not shown in these Figures) in accordance with this invention. In FIG. 6, each of the coils, marked $C_1$ through $C_8$, are shown in distinctively different types of lines so that the individual coils and the lead wires between coils can be more easily identified. The slots 72 between the teeth 74 are again labeled 1 through 8 and the tangs labeled $a$ through $h$. Tang $a$ is shown on both sides and is labeled $a_1$ on the right side of both FIGS. 6 and 7. FIG. 6 illustrates the manner in which an armature can be wound from one strand of wire beginning with its start end S at tang $h$. Proceeding from tang $h$, the wire is coursed downwardly through slot 4 and upwardly through slot 1 to form the coil $C_1$. After the appropriate number of turns have been wound, the wire is then projected to the tang $a$, looped under and around the tang $a$, and then coursed downwardly through slot 5 and upwardly through slot 2 to form the coil $C_2$. The winding pattern of FIG. 6 is completed by continuing the looping of the wire about the tangs 70 and the coursing of the wire through the slots 72 in the manner just described until the coil $C_8$ has been completed, at which time the finish end F of the wire is brought from the slot 8 to tang $h$. As part of the finishing operation, the start and finish ends S and F, respectively, are twisted together about the tang $h$.

FIG. 7 illustrates the winding pattern of FIG. 6 but wound from two strands of wire rather than one strand of wire. In FIG. 7 the coil $C_1$, $C_2$, $C_3$ and $C_4$ are wound from a first strand of wire, shown by dash lines, and the coils $C_5$ through $C_8$ are wound by a second strand of wire shown as a solid line. The start end of the first strand of wire, labeled $S_1$, is, as in FIG. 6, located at the tang $h$ and coursed downwardly through slot 4 and upwardly through slot 5 to form the coil $C_1$ and the winding of coils $C_1$ through $C_4$ progresses as in FIG. 6. The finish end $F_1$ of the first strand of wire projects from the side of coil $C_4$ in slot 4 to tang $d$. The start end, labeled $S_2$, of the second strand of wire is coursed from tang $d$ downwardly through slot 8 and upwardly through slot 5 to form the coil $C_5$. After the coils $C_5$ through $C_8$ have been formed, the finish end $F_2$ of the second strand of wire is brought to tang $h$. Subsequently, the start end $S_1$ and the finish end $F_2$ are twisted together about tang $h$, whereas the start end $S_2$ and the finish end $F_1$ are twisted together about the tang $d$. Once completed, the armatures represented by the wiring diagrams of FIGS. 6 and 7 will be mechanically and electrically identical.

A double flier armature winding machine, generally designated 90, which may be used to wind armatures having winding patterns of the types shown in FIGS. 2 through 7, is illustrated in FIGS. 8 and 9. In FIG. 8 the laminated core 62 of the armature 60 is shown abutted by a pair of wire guide wings 92 and 94 mounted on the ends of flier spindles 96 and 98, respectively. Bearings (not shown) mounted in housings, such as the housing 100 between the flier spindle 96 and the guide wing 92, permit rotation of the flier spindles 96 and 98 while the wire guide wings 92 and 94 are held stationary due to their engagement with the laminated core 62. The fliers 102 and 104 are mounted on and rotated with the spindles 96 and 98, respectively. The wire strands used in forming the coils may, as usual, be coursed through the spindle shafts 96 and 98 and around pulleys 106 and 108 on the ends of the fliers 102 and 104, respectively. The fliers 102 and 104 are synchronously rotated in opposite directions such that they pass each other on the same side of the wings 92 and 94 at the horizontal plane containing the longitudinal centerline of the armature shaft 66. Suitable hydraulic or electromechanical drives for synchronously rotating fliers are known and in use and, therefore, the drive mechanisms for the fliers 102 and 104 are not illustrated in detail herein. For example, U.S. Pat. No. 3,013,737, issued to Harry W. Moore on Dec. 19, 1961, is illustrative of a hydraulic drive mechanism which could readily be adapted for use with the apparatus of FIGS. 8 and 9. The same patent shows an air actuator arrangement for moving the wire guide wings into and out of engagement with armature cores which could be used in the apparatus of FIGS. 8 and 9.

To provide for a rotary drive for the armature 60 after each coil is wound, the end of the armature shaft 66 adjacent the commutator 64 is clamped to a drive shaft sleeve extension 110 of a hollow armature drive shaft 112. The sleeve extension 110 is threaded on the drive shaft 112 and fixed for rotation therewith by set screws 114 in an annular ring 116 affixed to the sleeve extension 110. The drive shaft 112 is mounted by a bearing 118 in a first support stanchion 120 supported by a plate 122 on a table 124 or the like and is driven by a stepping motor 126 having a drive shaft 128 with a drive pulley 130 mounted thereon connected by a timing belt 132 to a drive pulley 134 affixed to the drive shaft 112. Shown connected to the stepping motor 126 is an electrical control cable 160$a$ leading from a stepping motor control housing 160. Suitable controls located in the housing 160 for sequentially pulsing stepping motors are well known and, hence, not illustrated in detail herein. It will be appreciated that the sequences of operation of the apparatus of FIGS. 8 and 9, to be described below in connection with FIGS. 10 through 21, will be achieved through the motor controls and through suitable sensing switches (not shown) properly located to sequentially detect events occurring throughout the automatic operation of the apparatus.

Clamping of the armature shaft 66 to the sleeve extension 110 may take any convenient form. Illustrated for this purpose in FIGS. 8 and 9 is a split collet sleeve 136 which receives the armature shaft 66 and which is cammed into clamping engagement therewith by a cup-shaped collet clamp member 138 keyed to the sleeve extension 110 by a key 140 and mounted upon a collet actuator shaft 142 which passes axially through the drive shaft 112 and is mounted in a bearing 144 in a second support stanchion 146. On the rearward end of the collet actuator shaft 142, that is the end farthest to the right in FIG. 9, the actuator shaft 142 has a yoke ring 148 clamped thereto which receives confronting drive pins 150 of a yoke 152. The yoke member 152 is pivoted about a bracket 154 by an air actuator 156 having an air driven piston rod 158 and mounted on the second stanchion 146. As apparent, the armature shaft 66 can be clamped by the collet mechanism upon movement of the piston rod 158 to the right as viewed in FIG. 9 at the beginning of the winding procedure to be described below. The fully wound armature, at the end of the winding procedure, is released upon movement of the piston rod 158 to the left. The air actuator 156 can be operator controlled by a conventional push button switch control of electrically operated air valves (not shown) or be entirely automatically controlled in response to certain machine operations, all as well known to those skilled in the art.

In FIG. 8 the armature slots 72 have been labeled 1 through 8 to correspond to the labeling of the slots in FIG. 7. The coil $C_1$ is shown wound in slots 1 and 4 by the right hand flier 102 while the coil $C_5$ is shown wound by the left hand flier 104 into slots 5 and 8. The start wire ends $S_1$ and $S_2$ may conveniently be clamped by a combined wire clamp and cutter 162, which is only schematically illustrated in FIGS. 8 and 9, and which may be entirely conventional. As with present practice, the start ends $S_1$ and $S_2$ remain clamped until the armature is fully wound at which time they will be coursed through slots 4 and 8, respectively, to the appropriate tangs 70. During the winding of the coils by the fliers 102 and 104, the wire strands follow paths which would cause them to be hooked over exposed tangs 70. For this reason, a cylindrical tang shield 164 is mounted concentrically with and upon the drive shaft 112 and has one end thereof abutted against the commutator tangs. In some cases, the tang shield 164 may overlie the tangs 70. The external diameter of the shield 164 is greater than the total diameter of the commutator 64 with its tangs 70. Hence, the wire strands, when coils are being wound, are cammed away from the tangs 70 by the shield 164. When it is desired to hook the wire leads to the tangs 70, as will be described, the shield 164 is drawn away from the tangs 70 by an air actuator 166 having a pair of discs 168 mounted on its piston rod 170 and straddling a disc 172, the disc arrangement 168 and 172 operating in an obvious fashion to control the location of the tang shield 164 with respect to the tangs 70.

Figure 11:
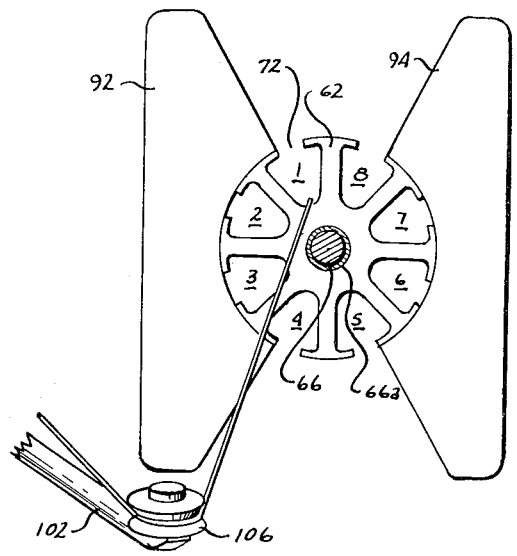
FIG. 11 is a cross sectional view taken through the armature shaft between the armature core and the commutator and showing an end view of a portion of the winding machine of FIG. 8 as viewed in the direction of arrows 11—11 of FIG. 10.
Figure 12:
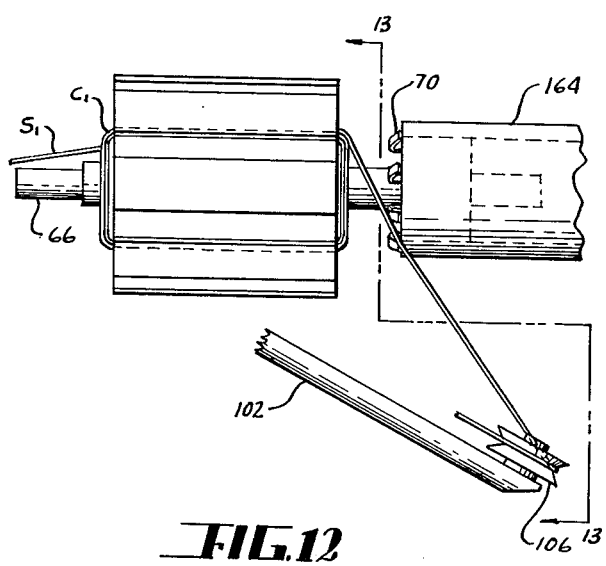
FIGS. 12 and 13 are views similar to FIGS. 10 and 11, respectively, but at the completion of the winding of a coil.
Figure 13:
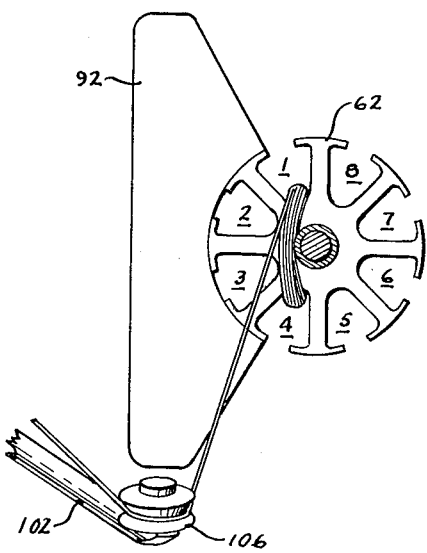

FIGS. 10, 11, 12 and 13 illustrate the sequence of operation of the machine of FIGS. 8 and 9 in winding the coil $C_1$ in slots 4 and 1. The winding of the coil $C_5$ by the flier 104 is not illustrated, it being well understood by those skilled in the art that the winding of the coil $C_5$ would proceed in substantially the same fashion as the winding of the coil $C_1$ but with the flier 104 rotating in the opposite direction from the flier 102. In FIG. 10 the shield 164 is shown abutted against the tangs 70 to prevent hooking of the wire on any of the tangs 70 as the flier 102 rotates. Upon rotation of the flier 102, the wire used to form coil $C_1$, with its start end $S_1$ clamped at 162 is pulled through a conventional wire tensioning device (not shown) at its supply end, through the spindle 96, and, as shown in FIGS. 10 and 11, is guided by the wire guide wing 92 into slots 1 and 4. The winding progresses until the appropriate number of turns have been wound by the flier 102 rotating in a clockwise direction as viewed in FIG. 10 to complete coil $C_1$. In the FIGS. 12 and 13 position, coil $C_1$ is fully wound and the flier 102 has come to rest with the length of wire leading from slot 1 to the pulley 106 lying adjacent the tang shield 164. FIGS. 12 and 13, it will be observed, show the same point in the sequence of operation as that illustrated in the perspective view of FIG. 8.

In FIGS. 14 and 15 the flier 102 is still arrested in the same position as that shown in FIGS. 12 and 13. However, the armature 60 has now been rotated through the operation of the stepping motor 126 shown in FIG. 9 by 180°. During this increment of rotation of the armature 60 the shield 164 has remained in place abutted against the tang 70. The effect of rotating the armature 60 while holding the flier 102 stationary is to draw wire from the flier 102 and partially wrap the wire about the shaft 66 and its insulating sleeve, designated 66a, to partially form the wire lead 82. The 180° rotation of the armature 60 has resulted in the tang $a$ being brought to a position just above the wire leading from the slot 1 to the flier pulley 106. Accordingly, with the armature 60 now stationary, the shield 164 is withdrawn from the tangs 70, i.e. moved to the right as illustrated and viewed in FIG. 16 by the shield air actuator 166 shown in FIG. 9. The position of the parts is then as illustrated in FIG. 16. The wire is then looped back over the tang $a$ by rotating the flier 102 in a reverse or counterclockwise direction from that shown in FIG. 16 through the broken line position shown in FIG. 17 to the nearly vertical position shown in full lines in FIGS. 17 and 18. Thereafter, the shield 164 is moved back into abutment with tangs 70, thus trapping the wire leading to the flier pulley 106 between the tang $a$ and the shield 164. The armature 60 is then rotated in the same direction as before, that is in a clockwise direction as viewed in FIG. 20, beyond 360° from its original position wherein slots 1 and 4 were presented for the winding of coil $C_1$ to apropriately position slots 2 and 5 adjacent the guide wing 92. Thereafter, the flier 102 is rotated in a clockwise direction from its dotted line position in FIG. 19 to begin the forming of coil $C_2$ in slots 2 and 5. As soon as the wire is pulled into slot 5, the wire lead 82 is completely wrapped about the shaft 66 as well as looped about the tang $a$. FIG. 21 clearly illustrates the single wire lead 82 which is formed between the coils $C_1$ and $C_2$ with the flier 102 rotating in a clockwise direction having partially wound the first turn of coil $C_2$. In the foregoing operation, when the armature 60 is rotated between the winding of the coils $C_1$ and $C_2$, the wire guide wings 92 and 94 may be moved slightly away from the armature core 62 so as not to interfere with such rotation.

Referring again to FIG. 8, it will be understood that the coils $C_1$ and $C_5$ are simultaneously wound by the fliers 102 and 104, respectively. Because the fliers 102 and 104 rotate in opposite directions, the end turns of all the coils as viewed from the commutator end of the armature span the slots in the same direction. The stopped position of the fliers 102 and 104 shown in FIG. 8 is such that upon subsequent rotation of the armature 60, the tang $e$ will be positioned immediately below the length of wire from slot 5 to the pulley 108 at the same time the tang $a$ is positioned above the wire leading from coil $C_1$ to the pulley 106 as previously described in connection with FIG. 14. The reverse rotation of the flier 102 illustrated by a comparison of FIGS. 14 through 18 is accompanied by a simultaneous reverse rotation of the flier 104 so that wire is hooked about tang $e$ at the same time that wire is hooked about tang $a$. By the time the winding of coils $C_1$ and $C_2$ has progressed to the point illustrated in FIG. 21, the wire lead 82 between coils $C_5$ and $C_6$ will be looped about tang $e$ and completely wrapped or looped about the shaft 66 in the same direction as the illustrated wire lead between coils $C_1$ and $C_2$. The winding of the armature 60 will continue in the manner just described until all coils have been wound with wire leads 82 therebetween. The armature shaft 66 is then released by the collet sleeve 136 and the start and finish wires twisted about appropriate commutator tangs as discussed above.

As apparent from the foregoing, the armature 60 is rotated in two increments by the stepping motor 126 between the winding of a pair of coils, first simultaneously to position the selected tangs 70 adjacent the wire leading to the fliers 102 and 104 about which the wire leads are to be hooked, and then rotated through an additional angle in the same direction to position the appropriate pairs of slots for receiving the next pair of coils to be wound by the fliers 102 and 104. The specific example discussed in FIGS. 7 through 21 involves the "progressive" pattern of wind mentioned above and, accordingly, the total rotation of armatures between the winding of pairs of coils is larger than 360° by the angle between adjacent slots. If the same armature were to be progressively wound with two coils per slot, the total rotation of the armature between the first pair of coils wound in a first pair of slots and the next pair of coils wound in the same pair of slots would be 360°. And after the second coil is wound in each of the first pair of slots, the total rotation of the armature in forming the wire leads 82 would be 360° plus the angle between adjacent slots, whereupon the first pair of coils would be formed in the second pair of slots. This procedure, of course, would be repeated until all sixteen coils are wound.

The retrogressive wind discussed above in connection with FIG. 3 can easily be accomplished with the same mechanism shown in FIGS. 8 and 9 but with the stepping motor controls so adjusted that the total rotation of the armature between coils to be wound in adjacent slots would be one slot width less than 360°. The wire leads between coils would still, of course, be wrapped around the armature shaft through an angle greater than 360° when the fliers 102 and 104 are subsequently rotated to wind the next pair of coils. Thus, it is seen that by virtue of the winding pattern of this invention and the apparatus of this invention, armatures having opposite polarities can be wound by merely adjusting the sequence control for the stepping motor 126. Sequential controls for stepping motors are commercially available in which the angle through which the stepping motor rotates upon each operation can be "dialed in" at the stepping motor control housing 160. In contrast, prior practice in armature winding machines frequently would require a complete revision of the tooling and a change in the direction of rotation of either the fliers or the armature as the winding operation progressed. Naturally, the changes in the armature winding machine would often be drastic and time-consuming.

As obvious, the winding pattern, the method, and the apparatus of this invention can be used when winding armatures having any usual number of slots, whether odd or even, and can be used to wind armatures having either one or two coils per slot. When winding odd slot armatures, the first coil or coils in the first pair of slots would be wound with only one flier operating; the remaining coils would be wound simultaneously in pairs by the two fliers 102 and 104. Also, the winding process described above could be accomplished by a single flier machine. Thus, in connection with FIGS. 10 through 21, the single flier operation illustrated therein could be used without another flier simultaneously operating therewith, but with repeated indexing or rotating of the armature sufficient to enable the single flier 102 to wind all of the coils. Further, it should be appreciated that the winding pattern is quite flexible and can be varied to meet the needs of the motor manufacturer. For example, the initial increment of rotation of the armature 60 to pick up tang a, as illustrated in FIGS. 14 and 15, could either be greater or less than 180° to pick up a different tang 70 which would be clockwise circumferentially either closer to or further from the commutator slot 1 from which the wire projects, the subsequent increment of rotation of the armature being through either a greater or a lesser angle in order to properly position slots 2 and 5 for receiving a coil as illustrated in FIG. 20.

Because wire leads are wrapped about the armature shaft rather than hooked about the armature teeth, the only time the fliers are reverse rotated is when the wire is hooked around the tangs 70 and, of course, there will be no tendency for the coils previously wound to unwind. When the fliers are thereafter rotated in the forward direction, that is the direction required to wind a coil, the wires cannot be unhooked from the tangs because they are trapped by the tang shield 164. Because the fliers rotate throughout almost the entire winding cycle in only one direction, with only the short reverse rotation used to hook the wire leads on the tangs, it will be appreciated that the flier drive mechanism, such as the hydraulic drive mechanism previously suggested and the automatic controls therefor, would be relatively simple. The speed with which an armature can be fully wound may be considerably reduced in view of this invention because there are fewer movements of the fliers and the armature required than in many other winding methods in which the wire leads are placed close to the armature shaft or in which lead loops are formed between coils.

To illustrate the nature of the automatic controls, an automatic flier control diagramatically illustrated at 179 for a hydraulic motor 180 is shown in FIG. 9. Motor 180 has an output shaft 182 driving a pulley 184 connected by a timing belt 186 to a driven pulley 188 affixed to the flier spindle 98 to rotate the flier 104. The same drive shaft 182 could be connected through a suitable reversing mechanism to the spindle 96 so that the fliers 102 and 104 rotate synchronously but in opposite directions. Also shown in FIG. 9 are a pair of sensing switches 190 and 192 mounted by a bracket 194 on the support stanchion 120 which sense the completion of forward and rearward movements of the discs 168 driven by the air actuator 166 to trigger operations subsequent to the tang shield withdrawal and shielding movements respectively. The rotation of the flier spindles 96 and 98 or the output shaft 182 could be sensed by switches responsive to conventional cams (not shown) thereon for triggering operation of circuitry with control 179. Of course, the described automatic controls are only exemplary of the type of controls commonly used and well known to those skilled in the art.

Although the presently preferred embodiment of the device has been described, it will be understood that within the purview of this invention various changes may be made within the scope of the appended claims.

Having thus described my invention, I claim:

1. In an automatic armature winding machine of the type having a flier which is rotated to wind coils into armature slots in an armature core mounted on an armature shaft, the improvement comprising armature rotating means engaging and rotating said armature shaft about its longitudinal axis at the end of the winding of one coil through an angle significantly greater than the angle between adjacent ones of said armature slots and sufficient to locate a pair of said armature slots substantially in a position to receive the next succeeding coil to be wound by said flier, flier drive and control means controlling the rotation of said flier operative to cause said flier to rotate after said pair of slots are so located to wind the next succeeding coil, whereby the wire leading from said one coil extends in one direction about said armature shaft to said next succeeding coil, and means to connect a portion of said wire leading from said one coil to a commutator segment on said armature shaft including means selectively shielding and exposing a selected commutator tang and means rotating said flier in a direction opposite to the direction said flier is rotated to wind the coil to hook said portion of said lead wire about said selected commutator tang when exposed.

2. In an automatic armature winding machine for winding coils into coil receiving slots in an armature core mounted on an armature shaft and for connecting wire leads between the wound coils to tangs of a commutator mounted on the armature shaft, said automatic armature winding machine being of the type having a wire guide, a flier rotatable to draw wire from a wire supply over said wire guide and into a pair of said coil receiving slots to form a coil therein, and reversible flier drive means operable to rotate the flier in opposite directions about a fixed axis of rotation, the improvement wherein said automatic armature winding machine further includes an armature drive shaft, supporting means supporting said armature drive shaft for rotation about a fixed axis perpendicular to the axis of rotation of said flier, releaseable clamping for connecting said armature shaft to said armature drive shaft for rotation therewith and supporting said armature in a position adjacent said wire guide to present a pair of slots for receiving wires drawn from said wire supply by said flier, and selectively operable drive means connected to said drive shaft repeatedly rotating said drive shaft and said armature through two spaced increments, both in the same direction, between the winding of each pair of said coils by said flier sufficient to loop the wire between each of said coils about said armature shaft to form a wire lead, and means responsive to the rotational movement of said armature reversing said flier drive means to rotate said flier in a direction opposite to the direction in which it is rotated to wind a coil in the interval between said two spaced increments of rotation of said drive shaft to hook a portion of said wire lead about one of said tangs.

3. The apparatus of claim 3 wherein said improvement further includes a commutator tang shield concentric with said drive shaft and movable toward and away from said tangs, and means synchronized with said selectively operable drive means for moving said shield relative to said tangs in the interval between the increments of rotation of said drive shaft to expose a selected tang positioned to receive said portion of said wire lead when said flier is rotated in said opposite direction.

4. The apparatus of claim 3 wherein said clamping means for clamping the armature shaft includes a collet and a collet actuating rod, said collet actuating rod projecting through and coaxially within said drive shaft.

5. The apparatus of claim 3 wherein said selectively operable drive means connected to said drive shaft includes a unidirectional stepping motor.

6. In an automatic armature winding machine for winding an armature of the type having an armature core with coil receiving slots and a commutator, the core and the commutator being mounted on a common armature shaft, the machine being of the type having a flier rotated to wind coils into the armature slots, the improvement comprising means for drawing wire from the flier between the winding of a pair of successively wound coils to form a wire lead therebetween looped completely in a single direction around the portion of the armature shaft between the core and the commutator, said means including armature rotating means having means engaging the armature for rotating the armature about its axis through an angle in the range of 360° ± the number of degrees between adjacent armature core slots after the winding of the first core of said pair of coils; and flier drive and control means for rotating said flier to cause the wire lead to be extended further around said portion of the armature shaft and directly into the first of a pair of slots in which the second coil of said pair of coils is to be wound so that, when the flier is first rotated to wind said second coil, the angular extent of said wire lead around the armature shaft exceeds 360° and said wire lead extends directly from an armature slot receiving a side of the first coil of said pair of coils around said portion of the armature shaft and directly into another slot receiving a side of said second coil without passing through any other slot of said armature.

7. In an automatic armature winding machine, the improvement set forth in claim 6, wherein said armature rotating means comprises collet means to grip the armature shaft, a drive motor, and motion transmitting means drivingly connecting the collet means with said drive motor and through which the drive motor imparts torque to the collet means.

8. In an automatic armature winding machine, the improvement set forth in claim 7 characterized by means for releasing the grip of the collet means upon the armature shaft.

9. In an automatic armature winding machine, the improvement set forth in claim 7, wherein said motion transmitting means includes a hollow shaft into one end portion of which the armature shaft is inserted, the collet means being mounted in said end portion of the hollow shaft, and power actuatable means in said hollow shaft operable upon the collet means to selectively cause the same to grip and release the armature shaft.

10. In an automatic armature winding machine, the improvement set forth in claim 9, wherein said collet means comprises a collar of resiliently deformable material confined between axially opposed shoulders in the hollow shaft, one of said shoulders being fixed with respect to said hollow shaft and the other being axially movable therein and constituting said power actuatable means.

11. The machine of claim 6 wherein said armature rotating means and said flier drive and control means repeatedly sequentially operate to loop all wires between all pairs of successively wound coils wound by said flier in said armature slots in the same direction completely around said armature shaft.

12. In an automatic armature winding machine for winding an armature of the type having an armature core with coil receiving slots and a commutator having a plurality of wire lead receiving tangs confronting the core, the core and the commutator being mounted on a common armature shaft, the machine being of the type having a flier rotated to wind coils into the armature slots and having shield means preventing the wire from hooking onto said tangs during the winding of coils, the improvement comprising means for drawing wire from the flier between the winding of a pair of successively wound coils to form a wire lead therebetween looped completely in a single direction around the portion of the armature shaft between the core and the commutator, said means including armature rotating means having means engaging the armature for rotating the armature about its axis in two successive steps through angles totaling in the range of 360° ± the number of degrees between adjacent armature core slots the winding of the first core of said pair of coils; flier drive and control means for rotating said flier to cause the wire lead to be extended further around said portion of the armature shaft and directly into the first of a pair of slots in which the second coil of said pair of coils is to be wound so that, when the flier is first rotated to wind said second coil, the angular extent of said wire lead around the armature shaft exceeds 360° and said wire lead extends directly from an armature slot receiving a side of the first coil of said pair of coils around said portion of the armature shaft and directly into another slot receiving a side of said second coil without passing through any other slot of said armature; and means for manipulating said shield means alternately to expose and cover selected ones of said tangs, said flier drive and control means including means rotating said flier in a direction opposite to the direction said flier is rotated to wind coils in timed sequence with said means for manipulating said shield means to hook said wire lead about one of said tangs when it is exposed and during the interval between said two successive steps so that said wire lead is looped completely around said one of said tangs when the armature is rotated during the second of said successive steps.

13. The machine of claim 12 wherein said armature rotating means, said flier drive and control means, and said means for manipulating said shield means repeatedly sequentially operated to loop all wires between all pairs of successively wound coils wound by said flier in said armature slots in the same direction completely around said armature shaft and to loop all of said wires completely around said tangs.

* * * * *

UNITED STATES PATENT OFFICE
CERTIFICATE OF CORRECTION

PATENT NO. : 3,973,738
DATED : August 10, 1976
INVENTOR(S) : Jerry E. Miller

It is certified that error appears in the above-identified patent and that said Letters Patent are hereby corrected as shown below:

```
Title:   "LEADING" should be ---LEAD---.
Col.  1, line 26, "incorporats" should be ---incorporates---.
Col.  1, line 56, "than" should be ---then---.
Col.  2, line 14, ---coursed--- should be inserted after "wire".
Col.  9, line 36, "coil" should be ---coils---.
Col. 10, line 34, "drive" should be ---driven---.
Col. 14, line 54, "with" should be ---within---.
Col. 15, line 34, after "clamping", insert ---means---.
Col. 15, line 52, "3" should be ---2---.
Col. 17, line 14, "core" should be ---coil---.
Col. 18, line 18, "operated" should be ---operate---.
```

Signed and Sealed this

Seventh Day of December 1976

[SEAL]

Attest:

RUTH C. MASON
Attesting Officer

C. MARSHALL DANN
Commissioner of Patents and Trademarks